US007870422B2

(12) United States Patent
Neyama et al.

(10) Patent No.: US 7,870,422 B2
(45) Date of Patent: Jan. 11, 2011

(54) APPARATUS AND METHOD FOR BACKING UP DATA ON SERVER USING AT LEAST ONE CACHE AS A CLIENT

(75) Inventors: Ryoh Neyama, Nishitokyo (JP); Toshiro Takase, Yamato (JP); Michiaki Tatsubori, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 11/954,876

(22) Filed: Dec. 12, 2007

(65) Prior Publication Data

US 2008/0162684 A1 Jul. 3, 2008

(30) Foreign Application Priority Data

Dec. 27, 2006 (JP) .............................. 2006-352187

(51) Int. Cl.
*G06F 11/00* (2006.01)
(52) U.S. Cl. .................................... 714/6; 714/4; 714/5
(58) Field of Classification Search ...................... 714/4, 714/5, 6
See application file for complete search history.

(56) References Cited

U.S. PATENT DOCUMENTS

| | | | | |
|---|---|---|---|---|
| 6,006,331 A * | 12/1999 | Chu et al. | ........................ | 726/5 |
| 6,018,805 A * | 1/2000 | Ma et al. | ........................ | 714/4 |
| 6,539,494 B1 * | 3/2003 | Abramson et al. | ............. | 714/4 |
| 6,629,144 B1 * | 9/2003 | Chu et al. | .................... | 709/227 |
| 6,687,849 B1 * | 2/2004 | Cherf | ............................. | 714/5 |
| 6,883,110 B1 * | 4/2005 | Goddard | ......................... | 714/6 |
| 7,065,674 B2 * | 6/2006 | Cabrera et al. | ................. | 714/16 |
| 7,480,822 B1 * | 1/2009 | Arbon et al. | ................... | 714/13 |
| 2003/0014480 A1 * | 1/2003 | Pullara et al. | ................... | 709/203 |
| 2004/0034807 A1 * | 2/2004 | Rostowfske | .................... | 714/4 |
| 2004/0117571 A1 * | 6/2004 | Chang et al. | ................. | 711/162 |
| 2005/0144283 A1 * | 6/2005 | Fatula | ......................... | 709/226 |

(Continued)

FOREIGN PATENT DOCUMENTS

JP 2004-185263 7/2004

(Continued)

*Primary Examiner*—Robert Beausoliel
*Assistant Examiner*—Joshua P Lottich
(74) *Attorney, Agent, or Firm*—Steven Chiu

(57) ABSTRACT

An apparatus and method is provided in which a server causes a client to back up a part of resource data of a server by use of an HTTP protocol. The method includes the steps of: transmitting the resource data to be backed-up to the client; determining whether or not the recovery of the resource data to be backed-up is required; transmitting, to the client, an HTTP response having a message that indicates the necessity of recovering the resource data to be backed-up, together with a message indicating that there is no update in the resource data to be backed-up, in response to the determination that indicates the necessity of recovering the resource data to be backed-up; and recovering the resource data to be backed-up by receiving a backup of the resource data to be backed-up from the client. The method of the present invention facilitates the processing of backing up, in the client, the resource data of the server and recovering the data when the resource data of the server is lost.

20 Claims, 10 Drawing Sheets

U.S. PATENT DOCUMENTS

| | | |
|---|---|---|
| 2006/0136524 A1* | 6/2006 | Wohlers et al. .............. 707/204 |
| 2006/0150147 A1* | 7/2006 | Tatsubori .................... 717/108 |
| 2007/0022199 A1* | 1/2007 | Tatsubori .................... 709/227 |
| 2007/0233851 A1* | 10/2007 | Ma ............................ 709/224 |
| 2007/0282979 A1* | 12/2007 | Tuel ........................... 709/219 |
| 2008/0082594 A1* | 4/2008 | Soltes et al. ................ 707/204 |

FOREIGN PATENT DOCUMENTS

| | | |
|---|---|---|
| WO | WO2005106710 | 11/2005 |

* cited by examiner

APPARATUS AND METHOD FOR BACKING UP DATA ON SERVER USING AT LEAST ONE CACHE AS A CLIENT

BACKGROUND OF THE INVENTION

1. Field of the Invention

This invention relates to backing up data in servers using web browser's cache memory of a client.

2. Description of Background

In recent years, data accumulated on web servers (web data) has been increasing in importance. In addition, it is necessary to back up data in case of an accidental loss. The total amount of these data has been on the increase. Moreover, since the number of users is also increasing, there are varieties of ways for data backup such as holding historical data for each user and the like. As a result, the operations of backup are becoming complicated and a workload thereof is becoming enormous. In order to back up these data on a server side, there is an increase in resource and management costs necessary to provide for the server. In the server, a tape drive and the like are used for the current data backup and recovery operations by use of the backup data.

Apart from this, as for backup and recovery operation both of which are likely to be operated on a client's side, a method for constructing a web application performed manually is used. The method can be seen especially in a home network router and the like, which are small-scaled web applications. In these small-scaled web applications, backup data is transmitted/received between a client and a server via HTTP (command input for executing the GET method or POST method), and is then stored. Moreover, when there arises a necessity for restoring web data by use of backup data, a file including the backup data is specified by use of an HTML input form whose type attribute is a file, and then the file is transmitted from the client to the server via HTTP (command input for executing the POST method) in order for the web data to be recovered. In other words, an operator of a web-browser manually performs the operations upon backup and recovery in the existing circumstances.

Furthermore, in Patent Document 1, a client has a cache function for temporarily storing contents of a web server, and the system is a distributed system for delivering contents. However, when the contents of the web server are destroyed or the like, how to upload contents held by the client as the backup data is not clearly disclosed. The prior art does not address the above mentioned problems and therefore, it would be desirable to provide for an apparatus and method in which a server or other large computing system can cause a client to provide back up of at least a part of resource data by use of an HTTP protocol.

SUMMARY OF THE INVENTION

The shortcomings of the prior art are overcome and additional advantages are provided through the provision of an apparatus and method in which a server causes a client to back up a part of resource data of a server by use of an HTTP protocol. The method includes the steps of: transmitting the resource data to be backed-up to the client; determining whether or not the recovery of the resource data to be backed-up is required; transmitting, to the client, an HTTP response having a message that indicates the necessity of recovering the resource data to be backed-up, together with a message indicating that there is no update in the resource data to be backed-up, in response to the determination that indicates the necessity of recovering the resource data to be backed-up; and recovering the resource data to be backed-up by receiving a backup of the resource data to be backed-up from the client. The method of the present invention facilitates the processing of backing up, in the client, the resource data of the server and recovering the data when the resource data of the server is lost.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
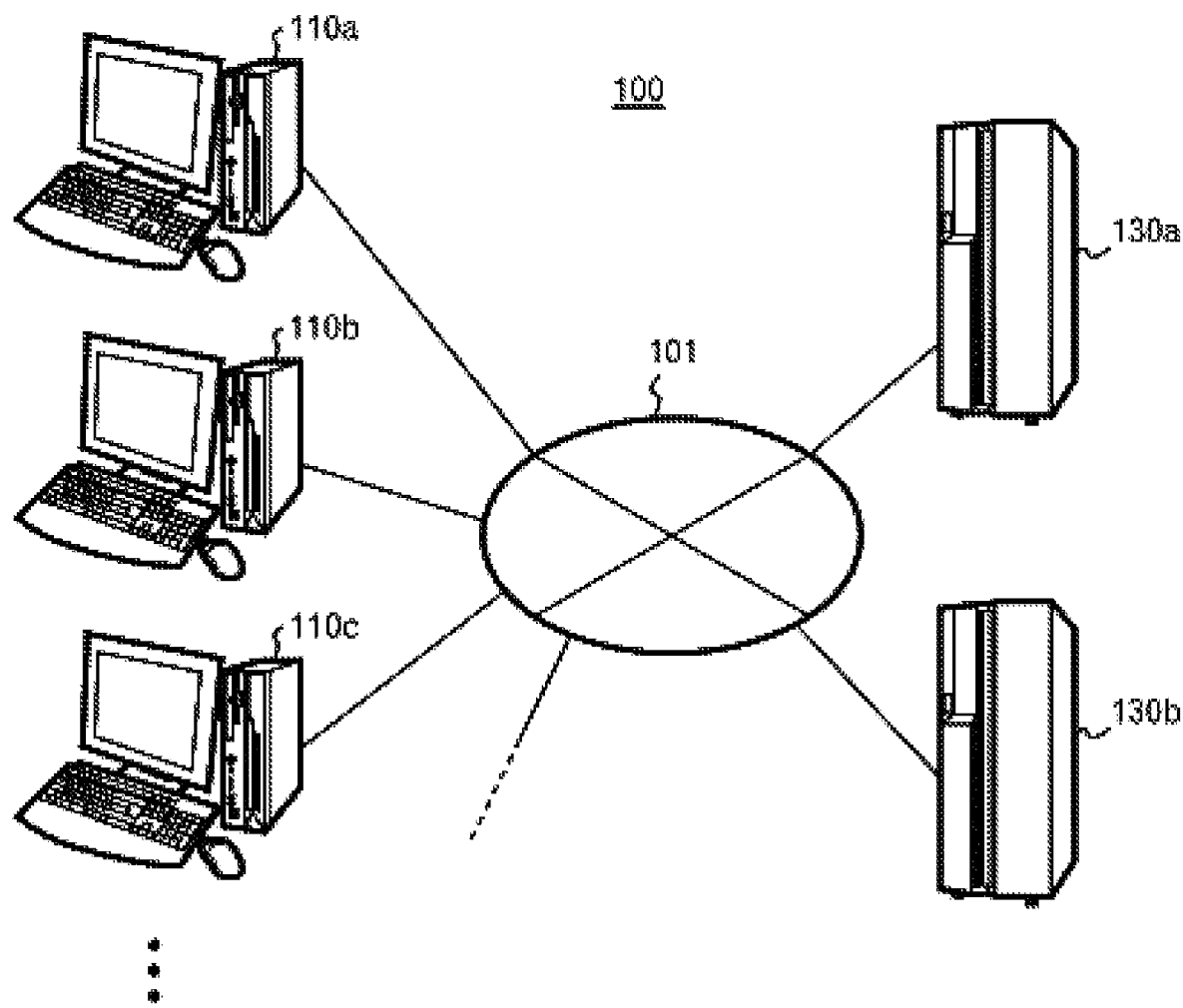
FIG. 1 is a schematic diagram of a backup system for a server used by a client's cache as per one embodiment of the present invention.

FIG. 1 is a schematic diagram of high levels of a backup system 100, which easily backs up data on a server by use of a client's cache and uploads the backed up data onto the server, of the present invention. Clients 110a to c, etc., connect servers 130a and 130b via a network 101. Here, the servers 130a and 130b are web servers as examples, and a plurality of servers 130 are provided. However, the number of servers 130 may be one. In addition, a plurality of client terminals are provided, but the system of the present invention can be performed with a single client terminal.

The clients 110a to c (and others) communicate with the web servers 130a and 130b via the network 101, and download backup data. Furthermore, when any one of backup data of the web servers 130a and 130b is damaged, the backup of the damaged data in any one of the clients 110*a* to *c* are uploaded onto the web server 130*a* or 130*b*.

Figure 2:
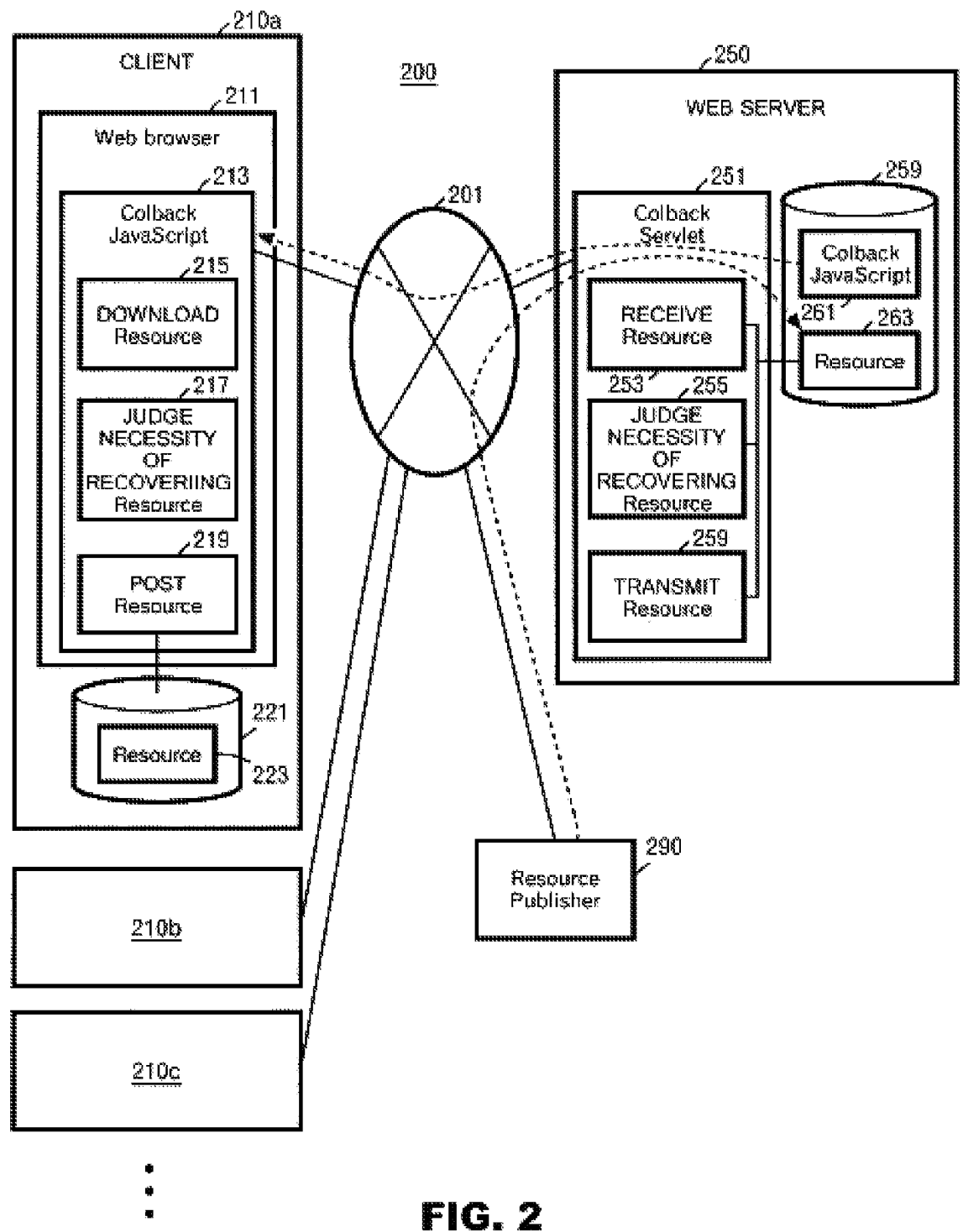
FIG. 2 is a schematic diagram illustrating various functional blocks of the backup system of FIG. 1.

FIG. 2 is a schematic diagram 200 which schematically shows functional blocks of the backup system according to the present invention. Clients 210*a* to *c* and others are connected to a web server 250 via a network 201. A numerical symbol 290 indicates a resource publisher, and is a source of a resource 263 stored in the web server 250. This resource 263 is generally web data, but may be another type of data which requires to be backed up. When the resource of the web server 250 is original, the resource publisher 290 does not necessarily exist in the backup system of the present invention.

The client 210*a* includes a web browser 211. After downloading a colback JavaScript 213, the client 210*a* executes a function 215 which downloads the resource, a function 217 which determines a necessity of recovering the resource, and a function 219 which posts the resource, by use of the web browser 211. The function 215 which downloads the resource is a function of downloading resource data which should be backed up from the web server 250. The function 217 which determines a necessity of recovering the resource is a function of determining whether or not the recovery of the resource data is required in the web server 250. The function 219 which posts the resource is a function of transmitting the resource data to the web server 250. Incidentally, the numerical symbol 213 uses the JavaScript language, but may be configured of another language, hardware, software, and the like.

Descriptions will be given of when these functions operate with reference to a sequence diagram which will be mentioned later. The client 210*a* has a memory 221, and stores source data 263 which has been backed up. The resource data 223 is a part or all of the duplicated resource data 263 in the web server 250. However, the resource data 223 and 263 may be different in terms of data formats and the like. The clients 210*b*, 210*c* . . . too have functions similar to those of the client 210*a*.

The web server 250 executes a function 253 which receives the resource, a function 255 which determines the recovery of the resource, and a function 257 which transmits the resource, by use of a colback servlet 251. The function 253 which receives the resource receives, from the clients 210, the resource data 263 which needs to be recovered. In addition, the function 253 may first receive the resource data subject to backup from the resource publisher 290, or may receive the data by another method. The function 255 which determines the recovery of the resource determines whether or not the resource data 263 requires to be recovered. The function 255 may determine whether or not the recovery of the resource data 263 is required on the basis of each part, for example, of a file unit. The function 257 which transmits the resource transmits the resource data 263 in order for the client to back up the data. The colback servlet 251 uses the Java (a registered trademark) technique, but a technique other than Java may be used to perform similar functions.

The web server 250 includes a memory 259 which has a colback JavaScript 261 and the resource data 263. The colback JavaScript 261 is downloaded to the clients 210 when the clients 210 access the web server 250. The colback JavaScript 261 and the colback JavaScript 213 are identical. Note that a plurality of web servers may be provided in the system.

Figure 3:
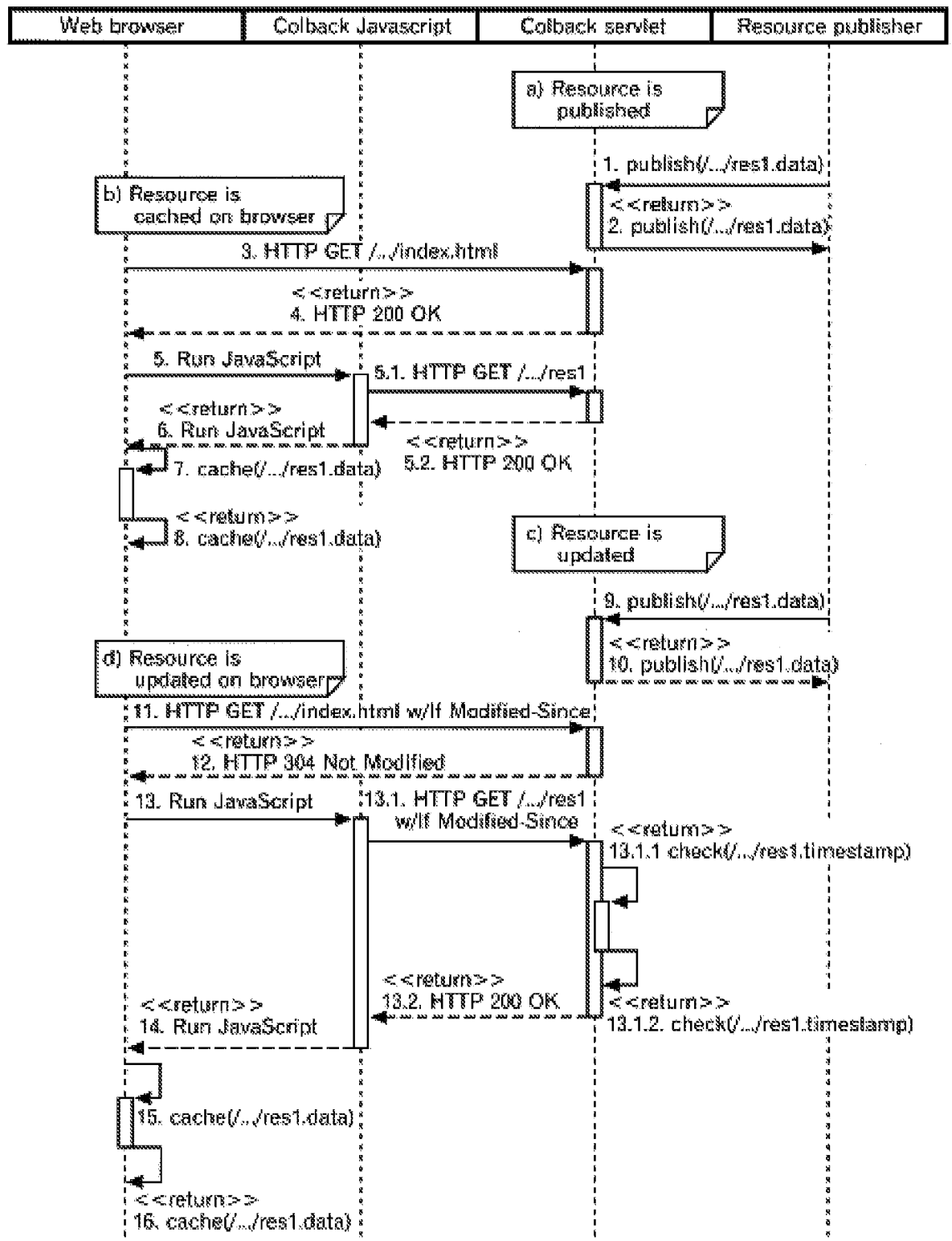
FIG. 3 is provides an illustration depicting a sequence in which resource data of a web server is backed up by the client as per one embodiment of the present invention.

FIG. 3 shows the sequence in which the resource data of the web server is backed up by the client. The following a to d are processed:

a) The resource publisher provides the resource data for a colback servlet (Steps 1 and 2). Although the resource data is provided directly for the colback servlet here, the data may be provided for the web server by another method, for example, by use of a ftp protocol. The provided resource data is associated with a designated URL (/ . . . /res1).

b) The duplication of the resource data is cached on the web browser. The web browser accesses a web page (Step 3). Here, the web browser accesses a URL represented by / . . . /index.html, and obtains request data by the GET method of HTTP. At this point, the server transmits colback JavaScript to the client (Step 4). The web browser interprets and executes the downloaded colback JavaScript (Step 5). The colback JavaScript accesses the colback servlet (the storage of the web server) by using the URL (/ . . . /res1) (Step 5.1), and downloads the resource data to be backed up (Step 5.2). The web browser receives the resource data (Step 6), and caches the resource data (Steps 7 and 8).

c) Suppose that the resource data on the web server is updated by the resource publisher (Steps 9 and 10).

d) The web browser updates the duplication of the resource data which was cached on the web browser.

The web browser accesses the web server (the colback servlet) again (Steps 11 and 12). Step 12 of FIG. 3 illustrates a case where there is no change in the colback JavaScript in the data on / . . . /index.html. When there is a change in the data on / . . . /index.html, the same processing as Step 3 is performed in Step 12. The web browser executes the colback JavaScript (Step 13). The executed colback JavaScript outputs an HTTP GET request for the colback servlet while including the URL (/ . . . /res1) and If-Modified-Since in the header (13.1). If-Modified-Since means that it downloads requested data if the data is updated.

The colback servlet which has received the HTTP GET request checks whether or not the resource data requires to be updated or recovered (Steps 13.1.1 and 13.1.2). Since the resource data is not yet lost at this point, the colback servlet checks, by use of the URL (/ . . . /res1) transmitted from the web browser and a timestamp extracted from the header, whether or not it is necessary to update the duplication of the resource data which has been cached by the web browser. Since the duplication of the resource data requires to be updated, an updated duplication of the resource data is returned to the web browser (the colback JavaScript) together with an HTTP response of 200 OK (13.2). If there is no necessity of updating the duplication of the resource data, an HTTP response of 303 Not Modified is returned. The web browser which has received 200 OK updates, with received new resource data, the duplication of the resource data previously cached as duplication (Steps 15 and 16).

Figure 4:
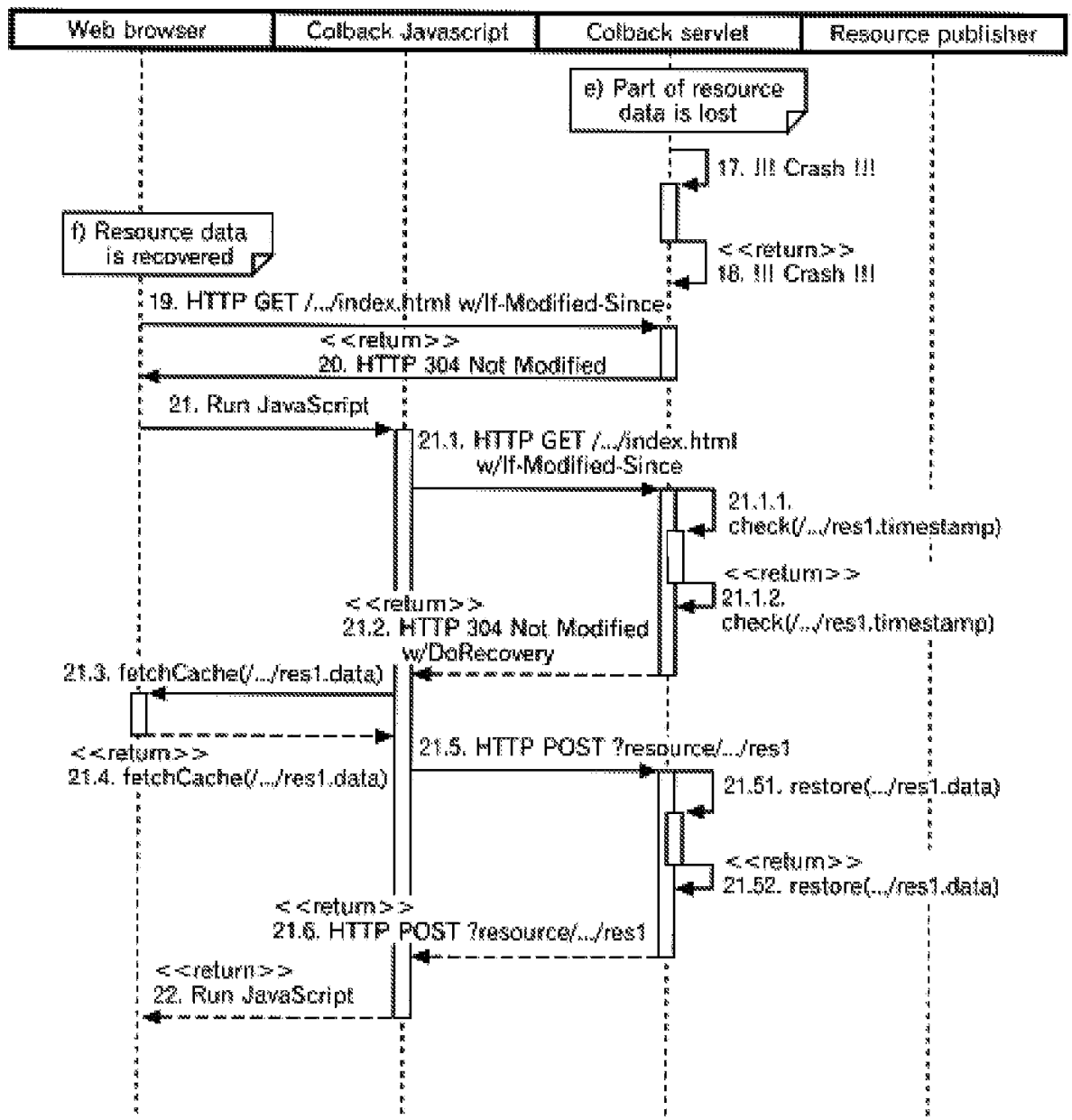
FIG. 4 is an illustration depicting a sequence in which resource data of a web server is recovered by use of source data which is backed up in the client.

FIG. 4 shows the sequence in which the resource data of the web server is recovered by use of the source data which has been backed up in the client. The following steps—e and f—are processed:

e) Suppose that the resource data stored in the web server is crashed and lost for some reason (Steps 17 and 18).

f) The resource data is recovered.

The web browser accesses the web server (the colback servlet) (Steps 19 and 20). Step 20 illustrates a case where there is no change in the colback JavaScript and the like in the data of / . . . /index.html. The web browser executes the colback JavaScript (Step 21). The executed colback JavaScript outputs an HTTP GET request for the colback servlet while including the URL (/ . . . /res1) and If-Modified-Since in the header (21.1). If-Modified-Since means that it downloads request data if the data is updated. The colback servlet which has received the HTTP GET request checks whether or not the resource data requires to be updated or recovered (Steps 21.1.1 and 21.1.2).

Since the resource data has just been lost here, the colback servlet checks, by use of the URL (/ . . . /res1) transmitted from the web browser and a timestamp, that it is possible to recover the lost data by using the duplication of the resource data which has been cached by the web browser. As a result of the check, it is determined that the data can be recovered. Thereafter, an HTTP response of 304 Not Modified is returned to the web browser with a special header (Cache-Control: ColBack=DoRecovery) indicating the request for recovery (Step 21.2). By using the conventionally existing HTTP response of 304 Not Modified, the web browser can download newly requested data (here, . . . /index.html) and then go on to the next processing.

If it is determined that the resource data cannot be recovered for a reason that the duplication of the data is too old, or another, an HTTP response of 404 Not Found is returned in order to indicate that the data is not found. Otherwise, an HTTP response of 503 Service Unavailable is returned in order to indicate that services are not available until the recovery of the resource data. Then, the web browser extracts the duplication of the resource data from the cache which has received the HTTP response of 304 Not Modified with Cache-Control: ColBack=DoRecovery onto the memory (Step 21.3), and transmits the duplication to the colback servlet (Step 21.5). The colback servlet which has received the duplication of the resource recovers the lost resource by storing the duplication in the storage area of the resource data (Step 21.5.1). The colback JavaScript and the web browser receive a message indicating that the recovery was made successfully (Steps 21.6 and 22).

The following are program codes which outputs a HTTP request with a header including If-Modified-Since to the colback servlet, and which then updates a cache or recovers the resource based on a response thereof, among the colback JavaScript.

```
<!DOCTYPE html PUBLIC "-//W3C//DTD XHTML 1.0 Strict//EN"
"http://www.w3.org/TR/xhtml1/DTD/xhtml1-strict.dtd">
<html xmlns="http://www.w3.org/1999/xhtml" lang="en" xml:lang="en">
<head>
<title>ColBack JavaScript</title>
<script type="text/javascript">
//<![CDATA[
var lastModified = "Thu, 01 Jun 1970 00:00:00 GMT";
function isRecoveryNeeded(req)
{var cacheControl = req.getResponseHeader("Cache-Control");
return cacheControl &&
cacheControl.match(/\s*ColBack\s*=\s*\"DoRecovery\"\s*/);}
function checkStatus( ) {var req = new XMLHttpRequest( );
req.open("GET", "resource", false);
req.setRequestHeader("If-Modified-Since", lastModified);
req.send("");
if(req.getAllResponseHeaders( ).match("Last-Modified"))
{lastModified = req.getResponseHeader("Last-Modified");}
if (req.status == 200 || req.status == 304) { // OK or Not Modified
if (isRecoveryNeeded(req))
{var responseText = req.responseText
// send req.responseText to the ColBack servlet for recovery
req.open("POST", "recovery ", false);
req.setRequestHeader('Content-Type', 'application/x-www-form-urlencoded');
req.send('value=' + responseText);} else
{// cache may be updated}}}
//]]>
</script>
</head>
<body>
<button onclick="checkStatus( )">Check Status</button>
<div id="content"></div>
</body>
</html>
```

The present invention is illustrated on the basis of a HTTP 1.1. The HTTP 1.1 has a function of cache control extensions, and can designate an arbitrary character string in a format of "name=value", as a value of a cache-control header which is permitted by the HTTP response of 304 Not Modified. Accordingly, it is assumed that, in the present invention, Cache-Control: ColBack=DoRecovery is used for the HTTP response of 304 Not Modified in order to indicate that the recovery of the resource is required.

If Cache-Control: Colback=DoRecovery is not used, it is possible to clearly check the necessity of the recovery by another HTTP request before or at the same time as outputting the HTTP requests in Steps 5.1, 13.1, and 21.1 in FIGS. 3 and 4 (by using another thread). In other words, in view of the conditions which are dependent on the type of a browser, it is obvious for those skilled in the art that an object of the present invention can be achieved by the above method in which the sequence is changed.

A number of examples will now be explored to provide ease of understanding.

Figure 5:
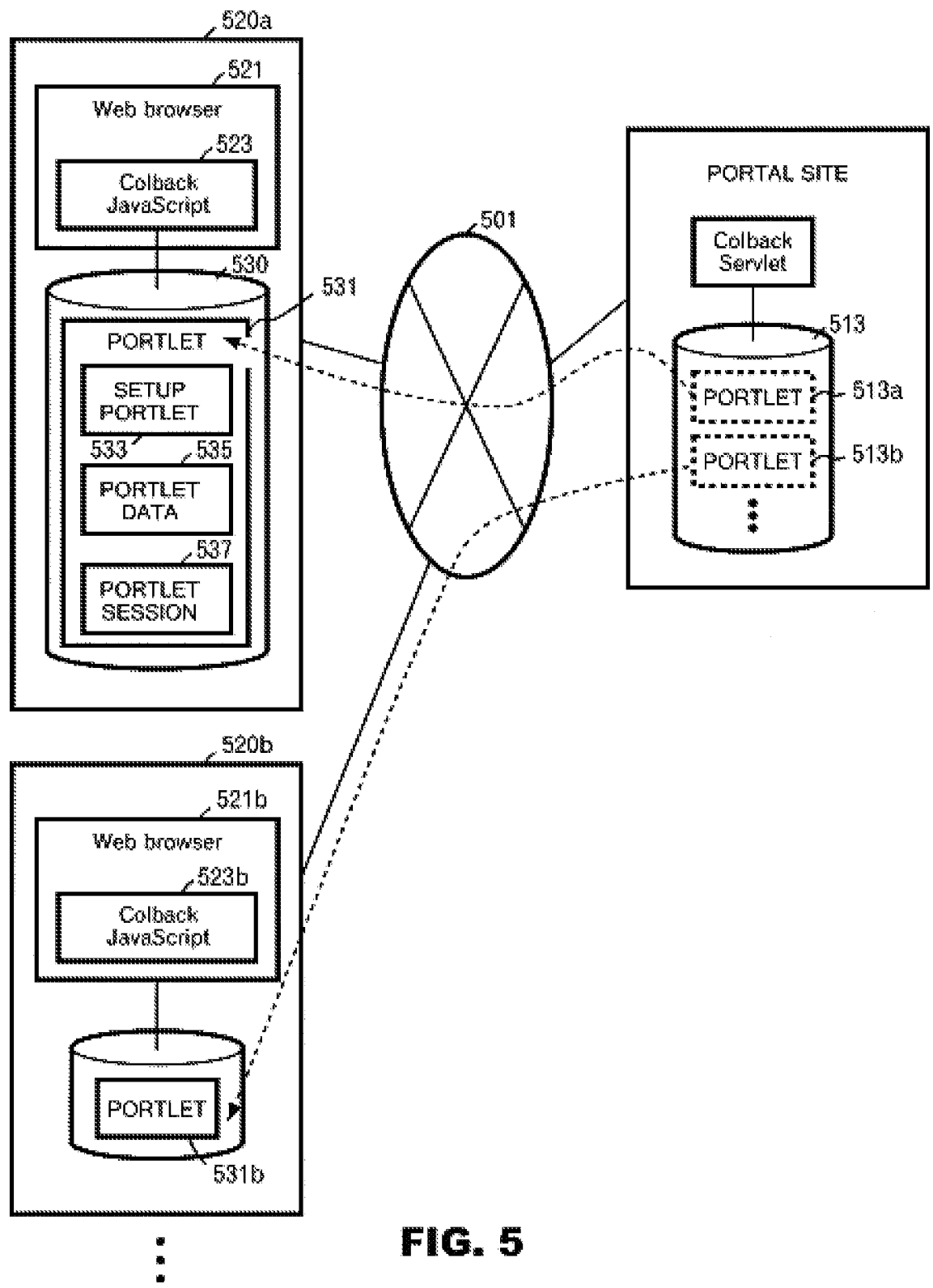
FIG. 5 is an illustration of a system that allows the backing up and recovery of data managed by a port-let in a portal site as per one embodiment of the present invention.

The first example—Example 1—is illustrated by FIG. 5. FIG. 5 shows an example of automatic backup and recovery of data managed by a portlet in a portal site, the example using the present invention. A portlet 531 manages three types of user's personal data including a portlet setup 533, portlet data 535, and a portlet session 537, in a client 520a. The portlet 531 included in the client 520a corresponds to a portlet 513a of a portal site. The portlet 531b included in the client 520b corresponds to a portlet 513b of the portal site. The portal site is conventionally required to back up the data 513a, 513b . . . , and thereby the backup is costly. However, the present invention enables a recovery even if a portlet of a portal site is deleted. The mechanism of the present invention facilitates the automatic backup and recovery of the data of a portlet. In the case of FIG. 5, a recovery can be made by adding a function of a colback servlet to a portlet container or a portlet.

Figure 6:
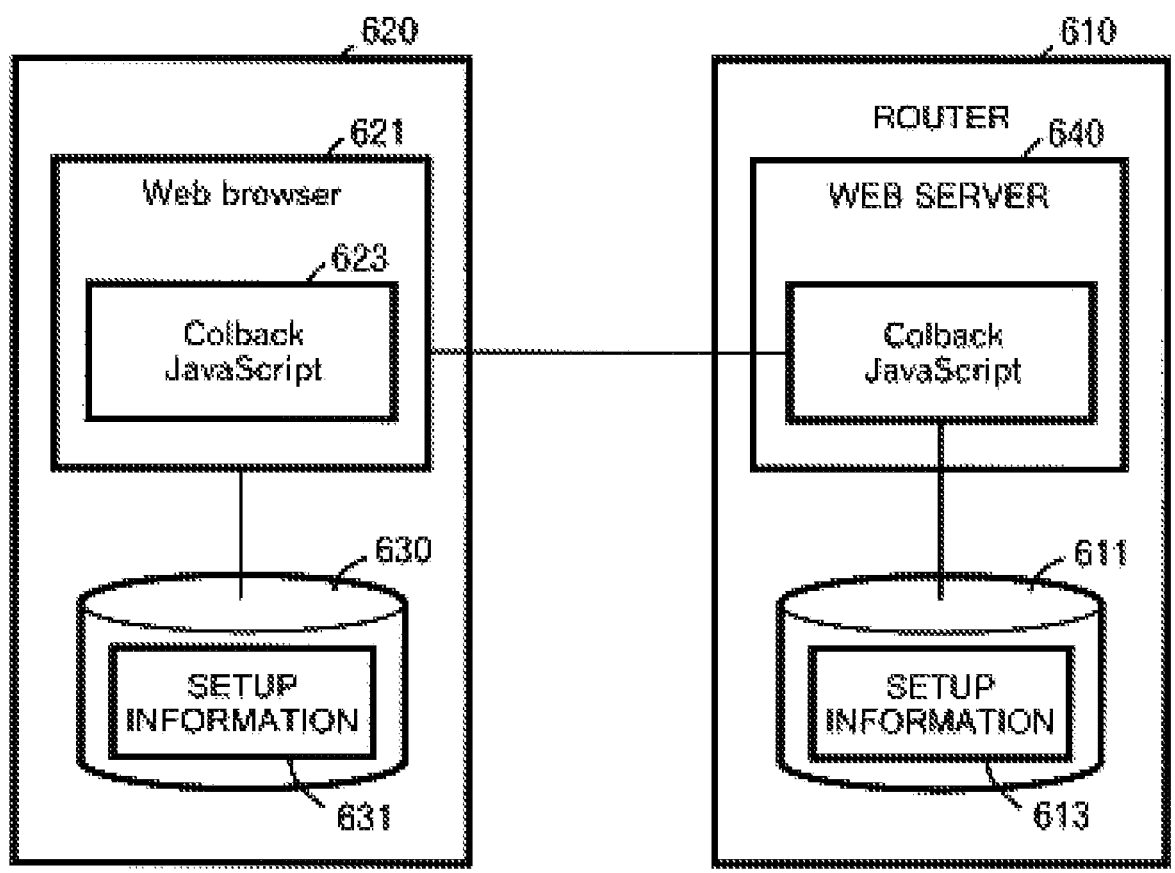
FIG. 6 is an illustration of an automatic system that provides for the backing up and recovery of the setup information of a router as per one embodiment of the present invention.

FIG. 6 provides a second example. FIG. 6 shows an example of automatic backup and recovery of setup information of a router, the example using the present invention. Some conventional routers include a function 640 of a web browser as a setup management interface for a manager, and the setup is designed to be managed, by accessing a designated URL which is a web browser, from a manager's computer. The manager saves, in the hard disk of the computer, a file (setup information) downloaded from the router to the browser by executing a save command (such as pressing a save button), in order to back up the setup information. In addition, it is possible to recover the setup information from the saved file by designating the area of the saved file and executing a recovery command (such as pressing a recovery button).

As mentioned above, conventionally, it is necessary for a manager to clearly save the setup as a file and make a manual recovery as needed. It is possible to automatically back up and recover setup information without troubling a manager, by saving the setup information of a router in a cache of a browser by using the mechanism of the present invention.

A backup is can then be made following the steps below that are provided by way of example:

1) A manager presses a "setup update" button on a browser in order to update the setup information of a router.

2) The router stores setup information 613 after update.

3) The router stores setup information 631 of the router in a cache of the browser, by returning a response to the browser (execute Steps 3 to 11 in FIG. 3)

By the same token, as per one embodiment of the present invention, a recovery can be made by way of example by using the following steps:

1) The manager starts Step 19 of FIG. 4 by opening a setup window on a browser in order to check the setup, and recovers the original setup information 613 of the router from the setup information 631 of the router in the cache.

2) This method can be applied not only to the router, but also to other information apparatuses (a hard disk recorder and the like) which are connected to networks and have interfaces of web browsers.

Figure 7:
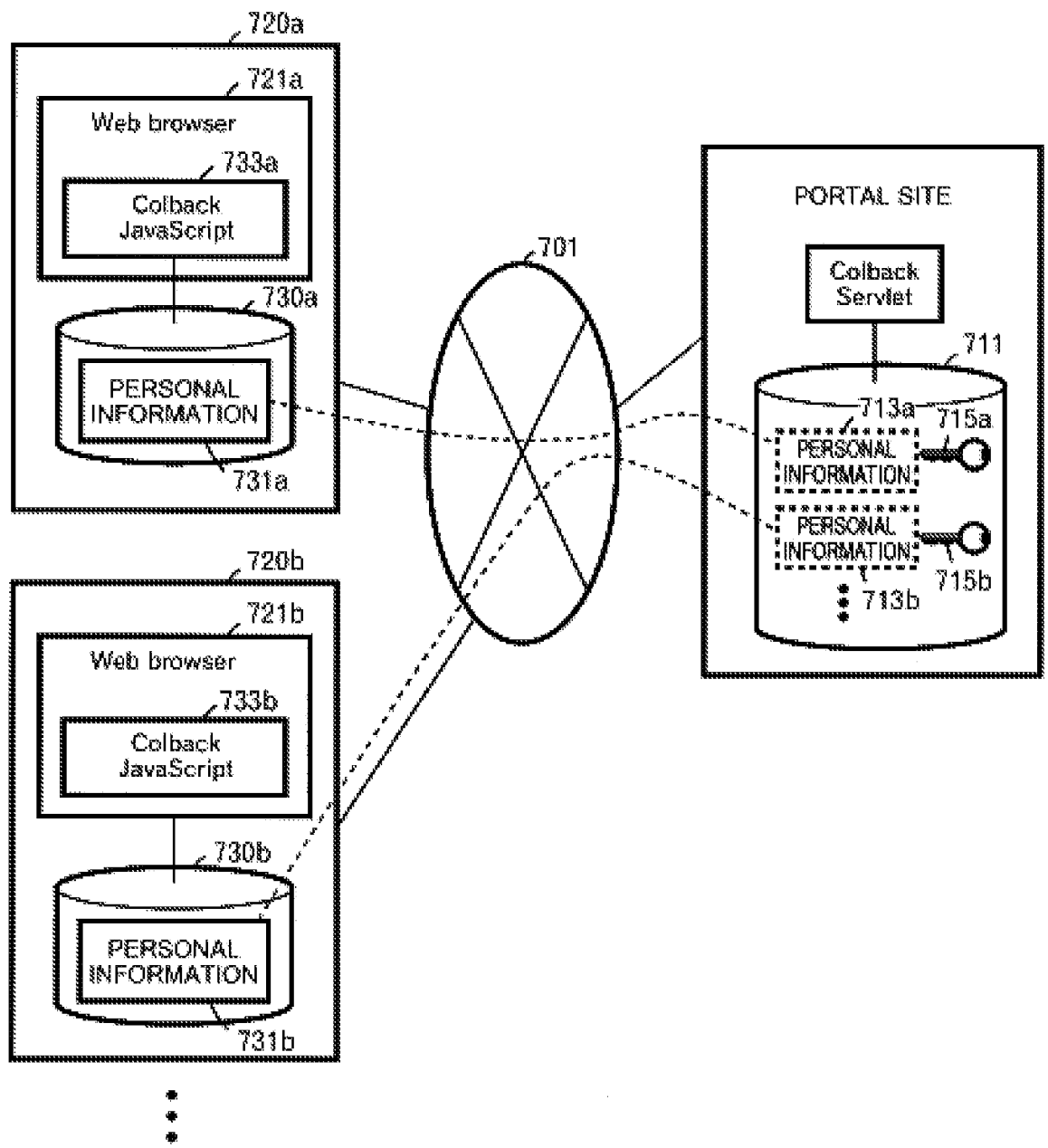
FIG. 7 is an illustration of one embodiment of present invention that provides a method for avoiding the permanent storing of personal information on a shopping site.

A third example is provided in FIG. 7. FIG. 7 provides for an illustration where avoiding the permanent storing of personal information on a shopping site and the like can be achieved. On some shopping sites, once personal information is registered upon the first use, the personal information stored in a server is automatically inputted in a form from the second time forward. However, in these days, interest in the protection of personal information has been increasing, so that operators of web sites are likely to think of holding as less personal information as possible. The personal information here includes not only a name, an address and a credit card number, but also the shopping history of a user. These pieces of information are assumed to be large to a certain extent.

The exchange of personal information with increased security is performed between a server and a client in the following procedure:

A user uses a site for the first time;

the user inputs his/her personal information and transmits the information to the server;

the server signs and encodes personal information 713*a* including a "shopping history" with a secret key 715*a* of the server, and caches personal information 731*a* as a duplication of the personal information 713*a* by returning the signed and encoded information to the browser (execute Steps 5 to 8 in FIG. 3 at the same time);

the server completes the processing of a report of applications by use of the personal information; and the server deletes the personal information from a disk.

When the user uses the site again, the personal information in the cache of the web browser is transmitted to the server with the application of the present invention. The server checks and decodes the signature, and automatically inputs the personal information in a form—such as provided in the Steps 19 to 22 in FIG. 4. Following this, as per one example, the following can occur:

display recommended products based on the "shopping history";

the server completes the processing of a report of applications by use of the personal information;

the server deletes the personal information from the disk.

With this procedure, the secret key of the server and the encoded data are stored in different areas, the server and the client. If the secret key of the server is stolen after (a), since the encoded data is on the disk of the client, it is more secure than a case where both of a secret key of the server and encoded data are on the server. Moreover, with regard to the handling of personal information, the operator of the site can express to the user that they delete the personal information immediately after a report is processed, without damaging the convenience of automatically inputting the personal information. Thus, the operator can add value to their services.

Figure 8:
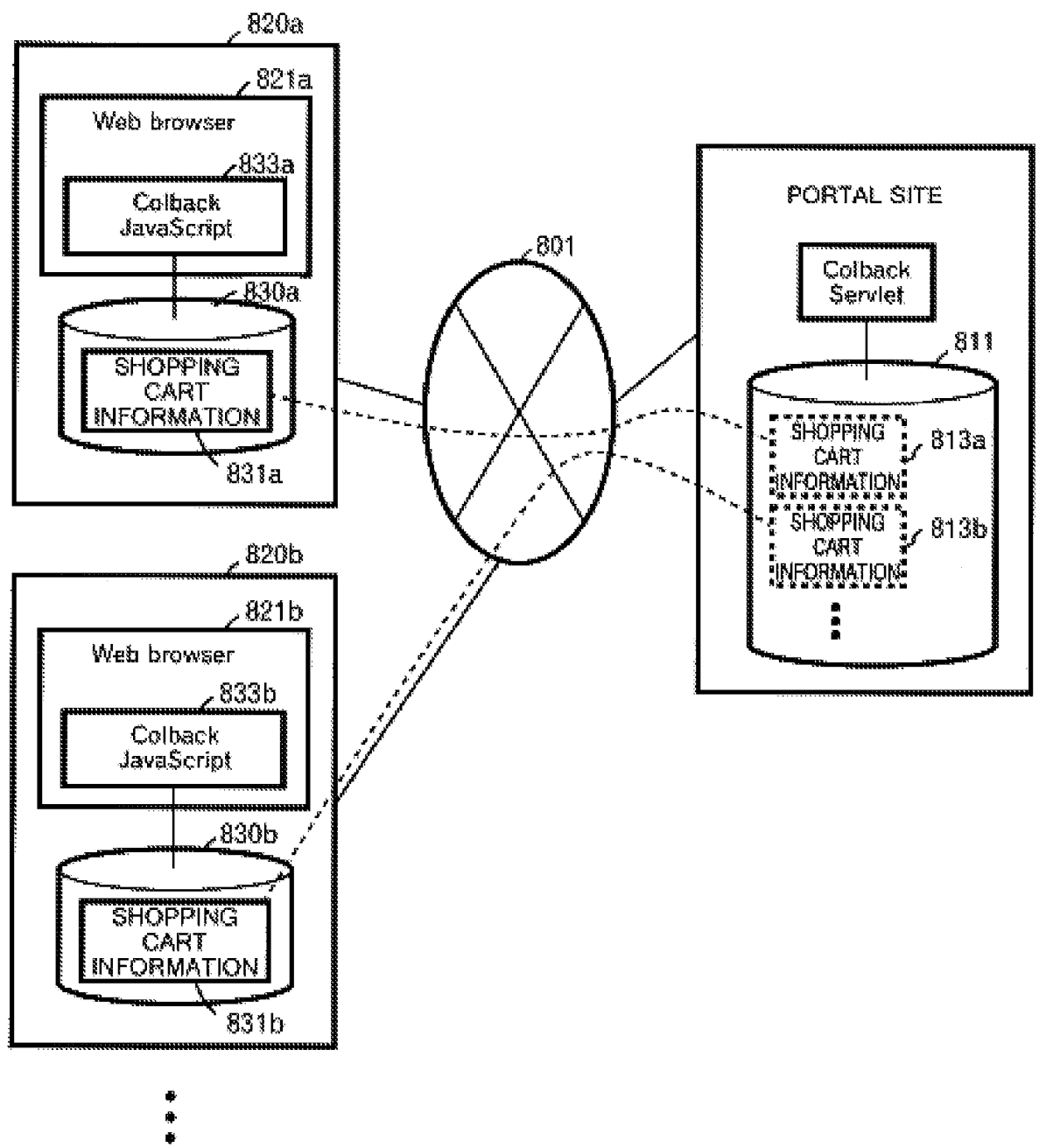
FIG. 8 is an illustration of an anonymous shopping site as can be interacted as per one embodiment of the present invention.

Yet another example is provided by use of FIG. 8. FIG. 8 provides for an illustration of a situation where shopping is occurring at an anonymous shopping site. The backup of information on a shopping cart is made in the following procedure:

a user uses a shopping site anonymously (without logging in to the site);

the user adds various products (such as a T-shirt) in a shopping cart 813*a* by designating various options (such as an image to be printed), and stores a shopping cart 831*a* on the client's side, too (execute Steps 13 to 16 in FIG. 3);

the user shuts down the browser application briefly for some reason;

the user restarts the browser application, and goes to the shopping site;

the shopping site restores the data on the previous shopping cart 831*a* (execute Steps 19 to 22 in FIG. 4);

after adding products, the user inputs information on login and a card, and purchases the products.

In the existing circumstances, a status of a shopping cart is stored on the side of the shopping site server, and a save ID is stored as a cookie by the client. However, when there are many users, the numbers of shopping carts become massive, which results in high management cost on the server side. On the other hand, the present invention makes it possible to temporarily store the status of the shopping cart on the server side, and to store the backup data thereof on the client side. Consequently, it is possible to restore the data on the status of the shopping cart even if the data is purged on the server side due to time and operating limits.

Figure 9:
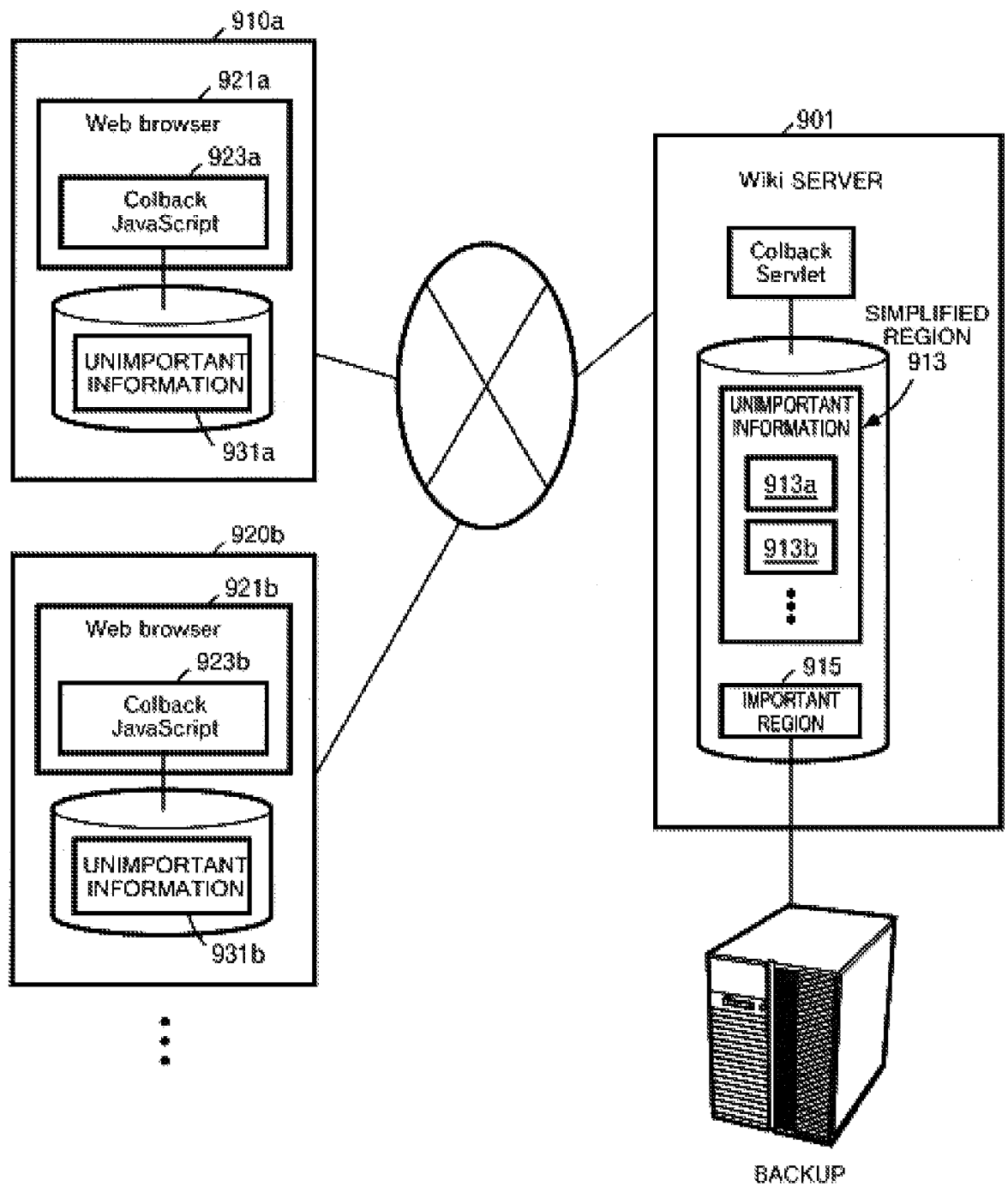
FIG. 9 is an illustration of a backing up service provided for as per one embodiment of the present invention using a Wiki server.

Another example is provided by using the example illustrated in FIG. 9. FIG. 9 provides an illustration of a situation where a Wiki server in a company is being backed up. The backup of the Wiki server is made in the following procedure:

an operator prepares an important region 915 which requires a strict backup (high cost), and a simplified region 913 which does not require a strict backup;

a user writes information important to business into the strict important region 915, and unimportant information (such as club activities) into the simplified region 913, and unimportant information 913*a* is stored in the client as unimportant information 931*a* (execute Steps 3 to 8 in FIG. 3);

the data in the simplified region is lost due to a disk failure of the server and an accident during operation; and the server restores the data in the simplified region (even partly) by use of the present invention (execute Steps 19 to 22 in FIG. 4).

In the existing circumstances, the backup is costly. Otherwise, there is no backup. However, there are many cases where although information is not important to business, it is convenient if there is a backup copy of the information even if the backup is simplified.

Figure 10:
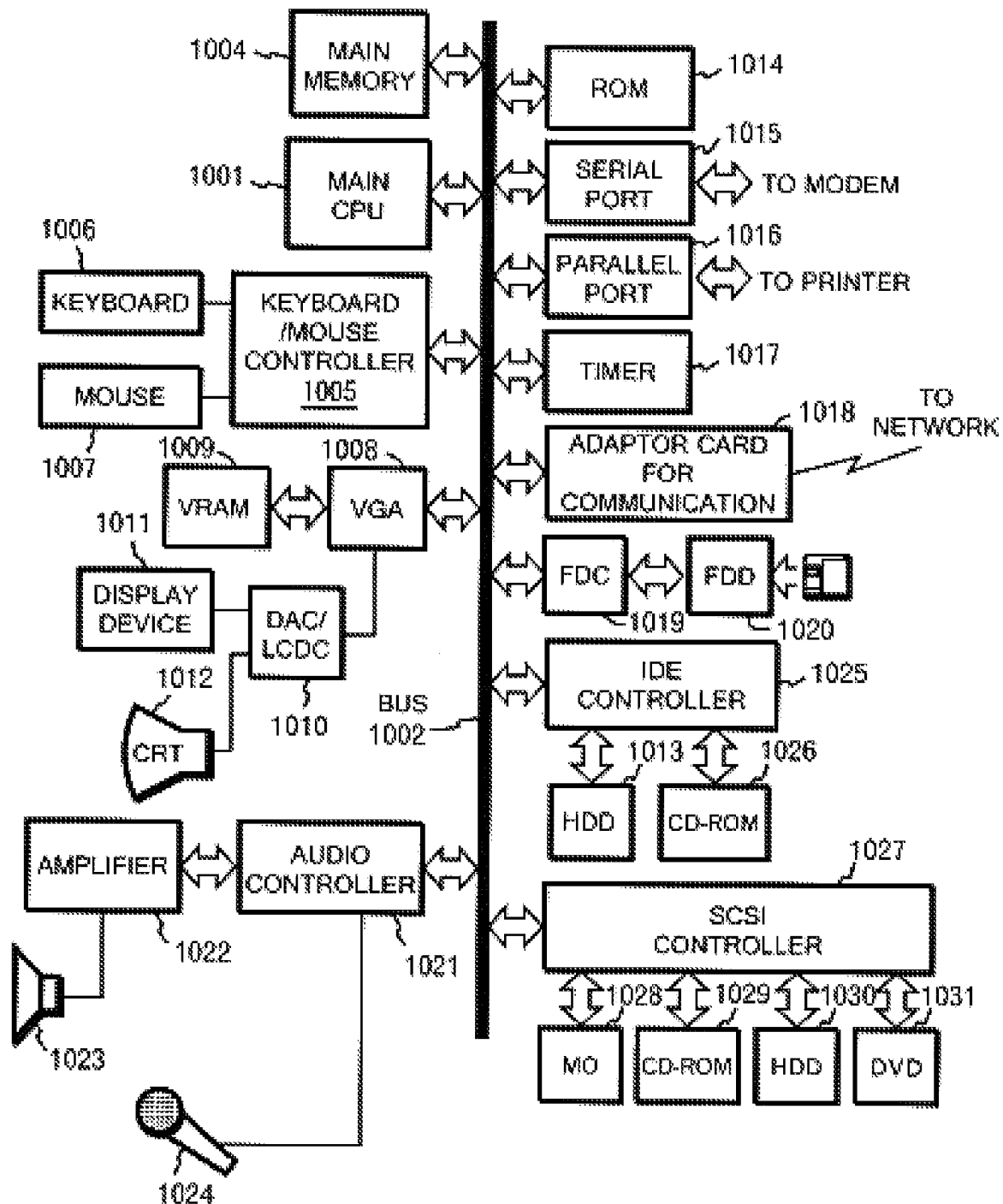
FIG. 10 is an illustration of a hardware configuration of an information processor system as per one embodiment of the present invention.

FIG. 10 is an illustration depicting an example of a hardware configuration of an information processor preferable to achieve the client 210 and the web server 250 according to an embodiment of the present invention.

The information processor includes a CPU (central processing unit) 1001 and a main memory 1004, both of which are connected to a bus 1002. Removable storages (external storage systems in which recording media can be exchanged) such as a hard disk apparatuses 1013, 1030 and CD-ROM apparatuses 1026 and 1029, a flexible disk apparatus 1020, a MO apparatus 1028, and a DVD apparatus 1031 are connected to the bus 1002 via a floppy disk controller 1019, an IDE controller 1025, an SCSI controller 1027, and the like.

Recording media such as a flexible disk, an MO, a CD-ROM, and a DVD-ROM are inserted into the removable storages. It is possible to store codes of a computer program for carrying out the present invention in these recording media, the hard disk apparatuses 1013 and 1030, and a ROM 1014 by giving a command to a CPU and the like in cooperation with the operating system. The computer program is executed by being loaded onto the main memory 1004. The computer program can be stored by being compressed or can be stored in a plurality of media by being divided into some parts.

The information processor receives an input from an input device such as a keyboard 1006 and a mouse 1007 via a keyboard/mouse controller 1005. The information processor is connected to a display 1011 for presenting visual data to a user, via a DAC/LCDC 1010.

The information processor can connect to a network via a network adaptor 1018 (an Ethernet® card or a token ring card) and the like, and can communicate with other computers and the like. Although not illustrated, the information processor can be connected to a printer via a parallel port or to a modem via a serial port.

From the above descriptions, it is easily understood that the information processor preferable to achieve the system according to the embodiment of the present invention is performed by an information processor such as a general personal computer, work station and main frame, or by a combination of those information processors. However, these constituent elements are examples, and it is not necessary that all the constituent elements should be essential to the present invention.

Naturally, those skilled in the art can easily imagine various modifications in a combination of a plurality of machines for each hardware constituent element of the information processor used in the embodiment of the present invention, the allocation of functions to these, the implementation of the function, and the like. Those modifications are concepts which are included in the spirit of the present invention as a matter of fact.

The system according to the embodiment of the present invention can adopt an operating system which supports a graphical user interface (GUI) multi-window environment such as Windows® operating system provided by Microsoft Corporation, MacOS® provided by Apple Computer, Incorporated, and a UNIX® system including the X Window System (for example, AIX® provided by International Business Machines Corporation).

As described above, it can be understood that the system used in the embodiment of the present invention is not limited to a specific operating system environment. In other words, as long as an operating system can provide a resource management function in which application software and the like can use the resource of a data processing system, any operating system can be adopted. Note that the resource management function can include the functions of hardware resource management, file handling, spooling, job management, storage protection, virtual storage management, and the like. However, these functions are well-known to those skilled in the art. Accordingly, detailed descriptions of these functions will be omitted.

Moreover, the present invention can be achieved as hardware, software, or a combination of hardware and software. As to the execution by the combination of hardware and software, the execution in a data processing system having a designated program can be cited as a typical example. In this case, by causing the designated program to be loaded onto the data processing system and to be executed, the program controls the data processing system and allows the present invention to perform the processing. The program is configured of a command group which can be expressed by an arbitrary language, code and notation. Such a command group makes it possible that the system executes a specific function directly, or after any one or both of the following: 1) conversion into another language, code and notation; and 2) duplication onto another medium.

The present invention naturally includes not only such a program itself, but also a medium storing the program in the scope thereof. The program to execute the functions of the present invention can be stored in an arbitrary computer-readable recording medium such as a flexible disk, an MO, a CD-ROM, a DVD, a hard disk apparatus, a ROM, an MRAM, and RAM. In order to be stored in a recording medium, the program can be downloaded from another data processing system which connects via a communication line and can be duplicated from another recording medium. In addition, the program can be compressed or divided into several units in order to be stored in a single or a plurality of recording medium. Moreover, it should be noted that it is naturally possible to provide a program product to carry out the present invention in various forms.

As described above, what can be easily constructed according to the embodiment of the present invention is a system which allows a client to back up a resource data of a web server, and which is capable of recovering resource data by using the resource data backed up by the client when the resource data of the web server is damaged, can be easily constructed.

It is obvious to those skilled in the art that various changes and modifications can be made in the above embodiment. It should be noted that such an embodiment in which the changes and modifications have been made is naturally included in the technical scope of the present invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for causing a client to back up part of a resource data of a server using an HTTP protocol, comprising the steps of:
    transmitting the resource data to be backed-up to the client;
    determining whether or not the recovery of the resource data to be backed-up is required;
    transmitting, to the client, an HTTP response having a message that indicates the necessity of recovering the resource data to be backed-up, together with a message indicating that there is no update in the resource data to be backed-up, in response to the determination that indicates the necessity of recovering the resource data to be backed-up; and
    recovering the resource data to be backed-up by receiving a backup of the resource data to be backed-up from the client.

2. The method according to claim 1, further comprising the step of transmitting a program for backing up the resource data to be backed-up when the data requested is transmitted to the client by the HTTP protocol.

3. The method according to claim 2, wherein the program is written in JavaScript.

4. The method according to claim 2, wherein the program is a program for causing a cache of a web browser of the client to back up the resource data to be backed-up.

5. The method according to claim 1, wherein the step of determining makes the determination by use of a URL and a timestamp, both of which have been transmitted from the client.

6. The method according to claim 1, wherein the server is a router, and the resource data to be backed-up is setup information of the router.

7. The method according to claim 1 in which the server is a shopping site, and in which the resource data to be backed-up is individual information of a user who uses the shopping site, the method further comprising the steps of:
   encoding the personal information by use of a secret key;
   deleting the personal information from the server after transmitting the resource data; and
   decoding the encoded personal information after the recovering step.

8. The method according to claim 1, wherein the server is a shopping site and the resource data to be backed-up is data on a status of a shopping cart of the client held on the server.

9. The method of claim 8, further comprising a step of deleting the data on the status of the shopping cart when the client shuts down a session with the server before completing the shopping.

10. The method according to claim 1, wherein the server is a Wiki server.

11. The method according to claim 10 wherein the server further comprises: an important region for managing important data; and a simplified region for managing unimportant data, and the resource data to be backed-up is data which is managed in the simplified region.

12. An apparatus comprising: a server which causes a client to back up a part of resource data of the server by use of an HTTP protocol, the server comprising:
   a means which transmits the resource data to be backed-up to the client;
   a recovery determining unit for transmitting, to a client, an HTTP response having a message that indicates the necessity of recovering the resource data to be backed-up, together with a message indicating that there is no update in the resource data to be backed-up when the recovery of the resource data to be backed-up is determined to be required in response to a GET request of HTTP from the client which receives the resource data to be backed-up if there is an update of the resource data to be backed-up; and
   a means which recovers the resource data to be backed-up by receiving a backup of the resource data to be backed-up from the client.

13. The apparatus according to claim 12, further comprising a means which transmits, to the client, a program to back up the resource data to be backed-up in a cache of a browser.

14. The apparatus according to claim 12, wherein the determination is made by use of a URL and a timestamp, both of which have been transmitted from the client.

15. The apparatus according to claim 12, wherein the server is a router, and the resource data to be backed-up is setup information of the router.

16. The apparatus according to claim 12, wherein the server is a shopping site.

17. The apparatus according to claim 16 wherein the resource data to be backed-up is individual information of a user who uses the shopping site and in which the recovering means includes means for decoding the encoded individual information.

18. The apparatus according to claim 12, further comprising:
   a secret key;
   a means which encodes the personal information by use of the secret key; and
   a means which deletes the personal information from the server after receiving the resource data to be backed-up from the client.

19. The apparatus according to claim 12, wherein the server is a shopping site, and in which the resource data to be backed-up is data on a status of a shopping cart of the client, the data being held on the server, the apparatus further comprising a means which deletes the data on the status of the shopping cart when the client shuts down a session with the server before completing the shopping.

20. The apparatus according to claim 12, wherein the server is a Wiki server, the server comprises: an important region for managing important data; and a simplified region for managing unimportant data, and the resource data to be backed-up is data which is managed in the simplified region.

* * * * *